US012786051B2

(12) United States Patent
Wolz et al.

(10) Patent No.: US 12,786,051 B2
(45) Date of Patent: Nov. 3, 2026

(54) SWITCHING DEVICE FOR ETHERNET-BASED FIELDBUSES

(71) Applicant: Robert Bosch GmbH, Stuttgart (DE)

(72) Inventors: Frank Wolz, Wertheim-Bettingen (DE); Thomas Eckert-Fentzahn, Kreuzwertheim (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 18/933,020

(22) Filed: Oct. 31, 2024

(65) Prior Publication Data

US 2025/0168061 A1 May 22, 2025

(30) Foreign Application Priority Data

Nov. 16, 2023 (DE) ..................... 10 2023 211 388.0
Dec. 21, 2023 (DE) ..................... 10 2023 213 191.9

(51) Int. Cl.
*H04L 41/08* (2022.01)

(52) U.S. Cl.
CPC .................................... *H04L 41/08* (2013.01)

(58) Field of Classification Search
CPC ... H04L 41/08; H04L 41/084; H04L 41/0895; H04L 41/0803; H04L 41/0813; H04L 41/0816; H04L 67/12; H04L 49/102; H04L 49/111; H04L 49/351; H04L 12/40; H04L 12/42; H04L 2012/4026; H04L 2012/40221; H04L 2012/5612; H04L 2012/6435; H04L 69/18
See application file for complete search history.

(56) References Cited

U.S. PATENT DOCUMENTS

2004/0133920 A1* 7/2004 Kim ................... H04N 7/17318 348/E7.071
2007/0147386 A1* 6/2007 Choi ................... H04L 49/3009 370/400
2007/0171912 A1* 7/2007 Mitsumori .......... H04L 12/5601 370/395.1
2008/0186992 A1* 8/2008 Kondapalli ........... H04L 49/602 370/419
2015/0249552 A1* 9/2015 Albrecht ................. H04L 12/40 370/402

FOREIGN PATENT DOCUMENTS

CN 117061623 B * 2/2024 ............. H04L 69/08
CN 118101476 A * 5/2024 ............. H04L 69/22

* cited by examiner

*Primary Examiner* — Kostas J Katsikis
(74) *Attorney, Agent, or Firm* — Maginot, Moore & Beck LLP

(57) ABSTRACT

A switching device for Ethernet-based fieldbuses include a primary interface and at least two secondary interfaces, a plurality of protocol modules, a recognition module and at least two first selection elements assigned to the at least two secondary terminals. The protocol modules are configured to provide switching and/or routing functionality according to one of a plurality of protocols. The recognition module is configured to recognize predetermined type values in Ethernet frames, to generate predetermined selection signals and, when one of the predetermined type values is recognized in a first Ethernet frame, to generate the selection signal that indicates the protocol assigned to the recognized type value. The selection elements comprise at least two first selection elements which are each in electrical connection with the at least two secondary interfaces.

11 Claims, 1 Drawing Sheet

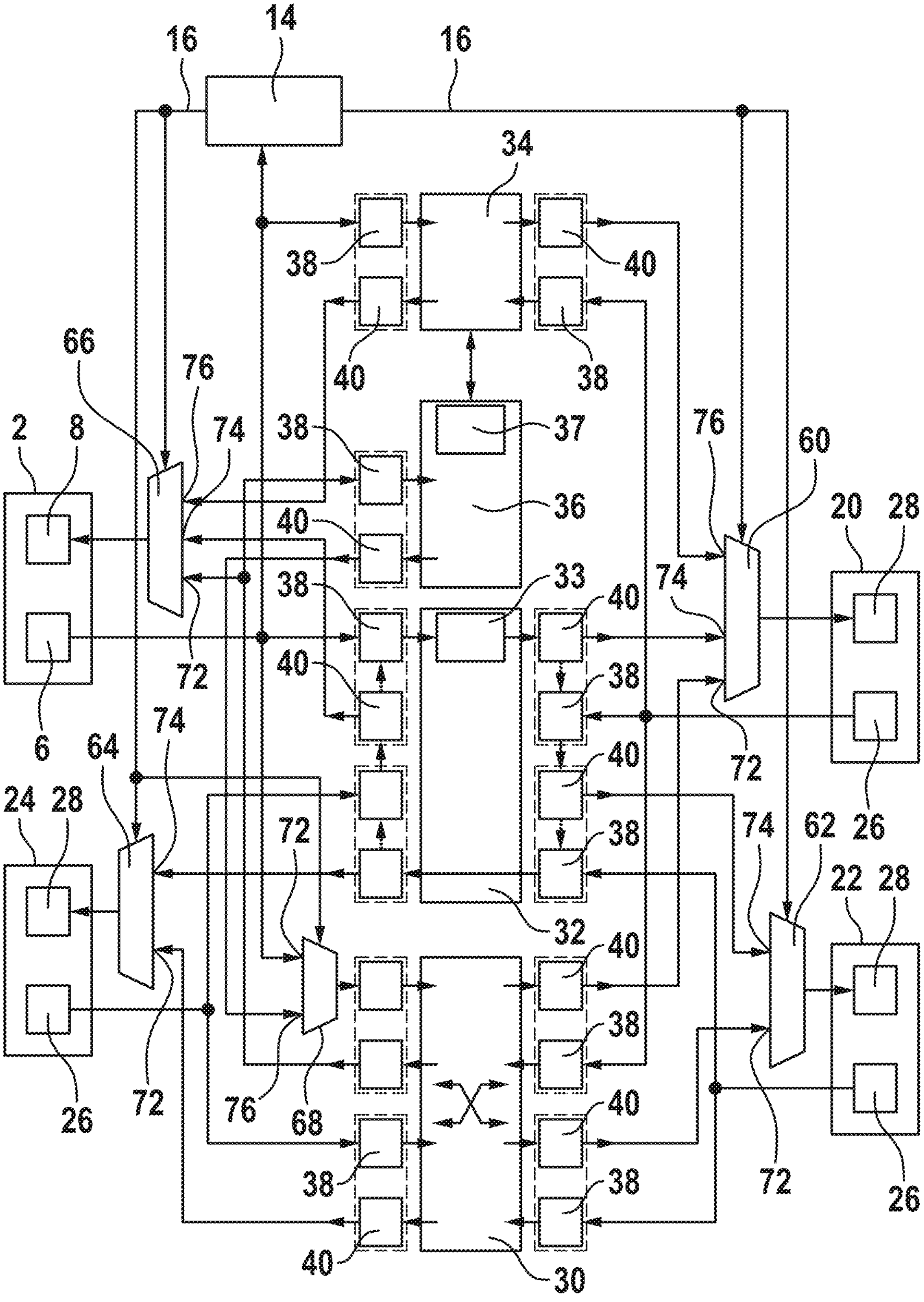
14
16
16
34
38
40
40
38
66
76
74
2
8
38
37
36
76
60
40
20
28
38
33
40
74
40
38
72
6
64
74
72
40
24
28
38
62
26
74
22
28
72
32
40
38
26
72
76
68
40
38
38
72
26
40
38
30

SWITCHING DEVICE FOR ETHERNET-BASED FIELDBUSES

This application claims priority under 35 U.S.C. § 119 to (i) patent application no. DE 10 2023 211 388.0, filed on Nov. 16, 2023 in Germany, and (ii) patent application no. DE 10 2023 213 191.9, filed on Dec. 21, 2023, the disclosures of which are incorporated herein by reference in their entirety.

The disclosure relates to a switching device for Ethernet-based fieldbuses, a gate network list for field-programmable logic arrays and a programming code for a field-programmable logic array.

BACKGROUND

In automation technology, fieldbuses are used to transmit messages or telegrams between different devices, such as controllers and machines in an automated production plant. The messages to be transmitted contain, for example, control commands, control parameters, sensor data or state data. Fieldbuses can be based on Ethernet, wherein the messages that correspond to the respective fieldbus message format are transmitted as user data in Ethernet frames.

Examples of Ethernet-based fieldbuses are PROFINET®, EtherNet/IP®, EtherCAT®, or SERCOS®. Depending on the fieldbus type, the field devices can be connected according to different topologies such as ring, star or line. The forwarding and routing of messages to the field devices typically occurs according to different methods for the various fieldbuses in star topology.

SUMMARY

The disclosure provides a switching device for Ethernet-based fieldbuses, a gate network list for a field-programmable logic array and a programming code for field-programmable logic arrays.

The switching device according to the disclosure comprises a primary interface and at least two secondary interfaces, a plurality of protocol modules, a recognition module and a plurality of selection elements. The protocol modules are designed to provide switching and/or routing functionality according to at least one of a plurality of protocols. The recognition module is set up to recognize predetermined type values in the Ethernet frames, to generate assigned selection signals and, if one of the predetermined type values is recognized in a first Ethernet frame, to generate the selection signal that is assigned to the protocol corresponding to the recognized type value. The selection elements comprise at least two first selection elements, which are each in electrical connection with the at least two secondary interfaces, wherein for each of the first selection elements the at least two inputs of the respective first selection element are connected to corresponding outputs of the at least two protocol modules and one output of the respective first selection element is connected to the transmitting terminal of one of the secondary interfaces. Accordingly, the switching/routing of the switching device is determined by the selection signal generated by the recognition module based on the recognized type value. Since type values determine specific protocols, the protocol module used is selected according to the protocol used in the received Ethernet-based fieldbus message. Thus, the switching device according to the disclosure automatically adjusts to one of the various Ethernet-based fieldbuses. For example, a first (master) device, such as a controller, can be connected to the primary interface, and further (slave) devices, such as field devices controlled by the controller, can be connected to the secondary interfaces. To do this, the switching device is configured by the recognition module based on a first Ethernet frame from the first field device.

In particular, the Ethernet frames comply with the IEEE 802.3 and/or ISO/IEC 8802-3 MAC standard. Furthermore, the type values include, in particular, EtherType values according to the IEEE 802.3 and/or ISO/IEC 8802-3 MAC standard and/or UDP port numbers. Alternatively, it is also possible to implement the type values using customer-specific assigned type values (and to include them in the user data field of Ethernet frames, for example).

In one embodiment, the primary interface has a transmitting terminal and the selection elements include a second selection element, wherein the output of the second selection element is connected to the transmitting terminal of the primary interface. The inputs of the second selection element are connected to the outputs of the corresponding protocol modules. This enables messages to be transmitted back to the master device connected to the primary interface. Since the configuration of the switching device is determined by the first Ethernet frame transmitted from the (master) device connected to the primary interface, the switching device maintains its configuration according to the protocol that is suitable for feedback messages from (slave) devices connected to the secondary interfaces (provided that the master device does not transmit any Ethernet frames that would result in a different selection signal while it is waiting for the feedback messages).

According to one embodiment, selection elements comprised at least a third selection element, wherein the output of the at least third selection element is connected to a corresponding input of a protocol module, and wherein one of the inputs of the at least one third selection element is connected to the receiving terminal of the primary interface, and wherein each of the inputs of the at least one third selection element is connected to the corresponding output of one or a plurality of the protocol modules. Accordingly, a configuration-dependent selection of the source of an input of the protocol module to which the output of the third selection element is connected is possible.

According to one embodiment, the selection elements comprise at least one fourth selection element, wherein the output of the at least one fourth selection element is connected to a corresponding input of a protocol module and wherein the inputs of the at least one fourth selection element are connected to assigned outputs of the protocol modules. This embodiment allows for internal routing of signals between protocol modules in response to the selection signal.

According to one embodiment, the protocols include a default protocol; wherein the recognition module is configured to generate a selection signal signaling the default protocol upon initialization of the switching device and/or prior to receiving the first Ethernet frame; and/or wherein each selection element is configured to switch to the state corresponding to the selection signal indicative of the default protocol upon initialization of the switching device and/or prior to receiving the selection signal from the recognition module. Each of the first and, if present, second selection elements can have an input assigned to the default protocol. The default protocol is a (generic) Ethernet routing/switching functionality. The default protocol enables communication with all devices connected to the interfaces during a configuration phase of the system after commissioning, for example.

According to one embodiment, the recognition module is configured to maintain the selection signal as long as the switching device is supplied with a supply voltage or until another selection signal is generated based on a type value of another, second Ethernet frame received at the receiving terminal of the primary interface, and/or each selection element is configured such that, once it has switched to one of the states, it retains its state until another selection signal is generated or for as long as the switching device is supplied with a supply voltage. This embodiment makes it possible to maintain the configuration of the switching device over a period of time, for example to receive messages from devices connected to one of the secondary interfaces and forward the message to the primary terminal.

According to one embodiment, each selection element is configured to switch to a state in which none of the inputs of the selection element are connected to the output of the selection element in response to the selection signal if the selection element has no input connected to the protocol specified in the selection signal. This helps to prevent communication from being directed to a protocol module or port that is not associated with the recognized type value and corresponding protocol.

According to one embodiment, the recognition module is configured so that it does not generate a selection signal or retains the existing selection signal if an Ethernet frame does not contain any of the predetermined type values. Accordingly, after recognizing a known type value (specifically, an EtherType value, i.e., a predetermined type value), the switching device will maintain its configuration when it receives an Ethernet frame with an unknown type value. If the selection signal is a non-permanent signal that configures the selection elements, which then maintain their configured state until a new selection signal is generated, the option that no selection signal is generated causes the selection elements to maintain their state.

According to one embodiment, the plurality of protocol modules and/or the recognition module and/or the plurality of selection elements are implemented on a field-programmable gate array (FPGA) or an application-specific integrated circuit (ASIC). This enables a configurable (e.g. different protocols, protocol modules) implementation of the switching device with fast processing options.

According to one aspect, a gate netlist is provided which, when implemented on an FPGA, causes the FPGA to implement the protocol modules and/or the recognition module and/or the selection elements of the switching device according to embodiments of the switching device. The term "gate netlist" refers, as is common in the field of electronic circuits, to a description of the connectivity of an electronic circuit, wherein at least a list of electronic components and a list of nodes connecting the electronic components (or their terminals) are included.

According to one aspect, a programming code (bitstream) for a field-programmable gate array, FPGA, is provided, which, when programmed into the FPGA, causes the FPGA to implement the protocol modules and/or the recognition module and/or the selection elements of the switching device according to the disclosure. The term "programming code" refers to code that determines the internal routing and logic in the FPGA, i.e. which elements of the FPGA (gates, logic cells, LUTs, . . . ) are used, how they are configured and how signals are routed between them. The programming code can be stored, for example, in a non-volatile memory of the FPGA, such as an EEPROM, and automatically loaded when the FPGA is started. When the FPGA starts up, for example, the programming code is loaded into an SRAM of the FPGA, which determines the internal routing and logic.

Further advantages and embodiments are described in the description and the attached drawings.

The drawings schematically show exemplary embodiments of the disclosure. Exemplary embodiments of the disclosure are described below with reference to the drawings.

BRIEF DESCRIPTION OF THE DRAWING

The FIGURE shows a switching device according to an exemplary embodiment of the disclosure.

DETAILED DESCRIPTION

The FIGURE shows a switching device according to an exemplary embodiment of the disclosure. In the FIGURE, connections between elements are shown as lines with arrows, wherein the arrows indicate the direction of data transmission.

The switching device comprises a primary interface 2 and a plurality of secondary interfaces 20, 22, 24. While the exemplary switching device shown has three secondary interfaces, there are generally at least two secondary interfaces. Each of the primary and secondary interfaces has a receiving terminal and a transmitting terminal. In particular, the primary interface has a receiving terminal 6 and a transmitting terminal 8, and the secondary interfaces 20, 22, 24 have receiving terminals 26 and transmitting terminals 28. Each interface can have a connector (not explicitly shown), such as an 8P8C socket (RJ45) or another connector used for Ethernet-based networks, for connection to a cable. Furthermore, each interface may include a receiver and a transmitter or transceiver (such as an Ethernet physical layer transceiver) to receive signals and provide corresponding internal signals on the receiving terminal and to transmit internal signals provided on the transmitting terminal as signals on the cable (if connected). The term "internal signals" refers to signals within the switching device, e.g. with a voltage level determined by the hardware of the switching device. Alternatively, the protocol modules (described below) can be used to provide for the receiver and transmitter (or a transceiver). Alternatively, the receiver and the transmitter or the transceiver may be part of the switching device. In this case, the interfaces, or more specifically their receiving and transmitting terminals, are (electrical) connections for receiving and transmitting communication signals that are received and transmitted by an Ethernet PHY connected to the interfaces (i.e. the receiving and transmitting terminals). This means that the interfaces (i.e. the receiving and transmitting terminals) can be connected to Ethernet PHYs that are not part of the switching device itself.

The switching device comprises a recognition module 14 connected to the receiving terminal 6 of the primary interface 2. The recognition module 14 is configured to recognize predetermined EtherType values (generally "predetermined type values", see below) in the Ethernet frame received at receiving terminal 6 of the primary interface 2. That is, the recognition module 14 receives Ethernet frames from the receiving terminal 6 of the primary interface 2 and analyzes them to determine their EtherType value, that is, the recognition module 14 determines (recognizes) whether the EtherType value contained in the EtherType field of the Ethernet frames is one of the predetermined EtherType values. The recognition module 14 can optionally be configured to take a VLAN tag (if present) in the Ethernet frame into account in this analysis (VLAN: virtual local network; VLAN tags are also referred to as 802.1Q tags and are marked with the value 0x8100).

Ethernet frames (and Ethernet blocks) are assumed to comply with the IEEE 802.3 and/or ISO/IEC 8802-3 MAC standard. Accordingly, certain information, such as specific communication protocols, is indicated by corresponding EtherType values (referred to as EtherType or EtherType value in the standards). The value 0x88CD, for example, stands for the Sercos® protocol (in particular Sercos® III), the value 0x8892 for the PROFINET® protocol, and the value 0x88A4 for the EtherCAT® protocol, which can also be identified by the EtherType 0x0800 (IP protocol) followed by a UDP header (User Datagram Protocol) with the destination port number 0x88A4.

For example, in the following description of the FIGURE, the recognition module is configured to recognize predetermined EtherType values contained in Ethernet frames according to the IEEE 802.3 and/or ISO/IEC 8802-3 MAC standard for the sake of simplicity. In general, it is possible to use other predefined type values instead of or in addition to EtherType values. In particular, any field value contained in Ethernet frames that points to a specific fieldbus can be used, i.e. it is recognized by the recognition module and mapped to a selection signal. As already mentioned, a specific UDP port number, for example, can indicate a specific protocol, such as the EtherCAT protocol. Another example is the field bus Modbus TCP/IP, which is mapped to Ethernet switching/routing (ET). As already mentioned, different type values can be mapped to the same protocol, i.e., they result in the same selection signal being generated. The term "type value" can generally include more than one numerical value, e.g. EtherType 0x0800 followed by a UDP port number 0x88A4 in the case of EtherCAT.

Furthermore, an additional Type field can be inserted into the Ethernet frames (in particular into the user data) by a field device connected to the primary interface. This type field can have predefined type values that are recognized by the recognition module to generate a corresponding selection signal. In this case, the protocol modules can be configured to remove this type field when routing Ethernet frames from the primary interface to the secondary interfaces and to add this type field (with a corresponding type value) when routing Ethernet frames from a secondary interface to the primary interface, so that standard (e.g. commercially available) equipment can be connected to the secondary interfaces.

Based on the recognized EtherType value (or generally type value), the recognition module 14 generates and outputs a selection signal 16. The selection signal can, for example, be output via one or a plurality of signal lines. The selection signal can be a temporary signal or a permanent signal.

In particular, the recognition module 14 is configured to generate a set of predetermined selection signals. It depends on the recognized EtherType value which selection signal is generated from this set (i.e. EtherType values are assigned to selection signals). The plurality of EtherType values can cause the same selection signal to be output. The set of predetermined selection signals can include a default selection signal that is generated when the switching device, in particular the recognition module, is initialized and/or starts up (e.g. at the beginning of the provision of a supply voltage or during a boot process) and/or when the EtherType values do not belong to the predetermined EtherType values. In addition, the default selection signal can also be output when a specific EtherType value, i.e. one of the predetermined EtherType value, is recognized. Thus, each of the predetermined EtherType values is mapped to one of the predetermined selection signals that is generated when the respective EtherType value is recognized (different EtherType values can be assigned to the same selection signal). Additionally, certain events can be assigned to one of the predetermined selection signals, such as the default selection signal that is generated. These events may, for example, be an initialization or a boot-up (boot-up) of the switching device, in which none of the predefined EtherType values are recognized in an Ethernet frame.

The switching device comprises a plurality of protocol modules 30, 32, 34, 36. While four protocol modules are shown in the exemplary embodiment of the FIGURE, the switching device generally includes at least two protocol modules. Each protocol module has at least one input, generally labeled with the reference number 38, and at least one output, generally labeled with the reference number 40. Each protocol module is set up to provide functionalities, such as routing and/or switching functionalities, according to a protocol from a plurality of (routing) protocols. For example, a first protocol module 30 is configured as an Industrial Ethernet switch, a second protocol module 32 is configured as an EtherCAT slave, a third protocol module 34 is configured as a Sercos slave, and a fourth protocol module 36 provides Ethernet MAC (Media Access Control) functionality in communication with the third protocol module 34 (Sercos slave). So-called UCC frames (UCC: Unified Communication Channel, which is part of the Sercos communication scheme) are exchanged (as indicated by a double arrow) between the third protocol module 34 and the fourth protocol module 36 to enable regular Ethernet switching for UCC frames. Therefore, the protocol modules 34 and 36 together form a gateway for standard Ethernet communication to a Sercos network (e.g. a closed ring topology). The second protocol module 32 (EtherCAT slave) and the third protocol module 34 (Sercos slave), for example, essentially transfer telegrams contained in Ethernet frames from an input 38 to an output 40, as specified in the respective specification (EtherCAT, Sercos). A protocol module, for example the second protocol module 32, can also contain a processing unit 33 that provides some fieldbus-specific telegram processing functions. The third protocol module 34 can additionally extract and/or add Ethernet telegrams to a sercos network in exchange with protocol module 36 (normally a standard Ethernet MAC unit) to provide a gateway for standard Ethernet frames. To do this, a processing logic 37 organizes the exchange of telegrams between the protocol modules 34 and 36.

In the exemplary embodiment shown in the FIGURE, there are three (routing/switching) configurations: (generic) Ethernet switching/routing (ET), EtherCAT (EC) and Sercos (S3). Specifically, more than one fieldbus protocol (as indicated by the EtherType) may correspond to the same configuration. For example, Ethernet values of fieldbuses that use (generic) Ethernet switching/routing (ET) can all be linked to ET. As in many cases, EtherType values indicate certain protocols, each protocol is assigned (or equivalent to) at least one EtherType value (the predetermined EtherType value). As already mentioned, there may be other telegram criteria for field values in addition to the EtherType, especially for some of the fieldbuses not explicitly mentioned above. Since the selection signal is output based on the recognized fieldbus type, each selection signal indicates a (routing) configuration. The protocols can contain a default protocol, e.g. ET, wherein the default selection signal mentioned above refers to the default protocol.

In the embodiment shown in the FIGURE, the receiving terminal 6 of the primary interface 2 is connected to the respective inputs 38 of the second protocol module 32 and the third protocol module 34. These connections can be considered as direct connections. In addition, the receiving terminal 6 of the primary interface 2 is connected to an input of a (third) selection element 68 (see below for a description of the selection elements), wherein the output of the selection element is connected to an assigned input of the first protocol module 30. This connection can be regarded as an indirect connection. Generally, receiving terminal 6 of primary interface 2 is connected to the respective inputs 38 of at least one or at least two protocol modules (in the sense of a direct connection). In any case, at the receiving terminal 6 of the primary interface 2 received Ethernet frames can be transmitted to at least two of the protocol modules and processed there, wherein it is assumed that if there is only one direct connection, there is an additional indirect connection.

The switching device further comprises a plurality of selection elements 60, 62, 64, 66, 68, for example multiplexers, connected to the recognition module 14 to receive the selection signal 16 output. Each of the selection elements 60, 62, 64, 66, 68 is adapted to switch to a state different from predetermined ones in response to receiving the selection signal, wherein the state to which the selection element switches is dependent on the selection signal. Different selection elements can have different states. Each selection element 60, 62, 64, 66, 68 has one output and at least two inputs 72, 74, 76. For each selection element, each input is assigned to one of the protocols. A selection module may have fewer inputs than protocols.

The state set includes at least a number of states, also known as connected states, that correspond to the number of inputs. If a selection element is in one of these connected states, one (and only one) of the inputs is connected to the output. Optionally, the state set of each selection element (independent of other selection elements) includes a state, also referred to as a disconnected state, in which none of the inputs are connected to the output. For each selection element, each of the predetermined selection signals is assigned to one of the states of the selection element, i.e., the selection element is switched to the corresponding state when the selection signal is received and/or present (in other words, in response to the generated selection signal). When a selection signal assigned to a connected state is received and/or present, the input assigned to the protocol designated by the selection signal is connected to the output. If a selection signal is newly generated and/or present that is not assigned to a connected state, i.e. is assigned to the unconnected state, no input is connected to the output. Different selection signals can correspond to the disconnected state. One of the states of each selection can (independently of other selection elements) also be a default state, in which the selection element is switched if no selection signal has been received (or is present) or during initialization and/or boot-up of the switching device and/or the selection element and/or in response to the default selection signal.

For example, with reference to the FIGURE, in response to the selection signal indicating protocol ET (regular Ethernet routing/switching functionality, e.g. when EtherType value 0x8892 indicating PROFINET RT is recognized), a first input 72 of selection elements 60, 62, 64, 66, 68 is connected to the output of the respective selection element. A second input 74 of the selection elements 60, 62, 64, 66 is connected to the output of the respective selection element in response to the selection signal indicating the protocol EC (EtherCAT routing functionality, e.g. when the EtherType value 0x88A4, which recognizes EtherCAT, is recognized). A third input 76 of the selection elements 60, 66, 68 is connected to the output of the respective selection element in response to the selection signal indicating protocol S3 (Sercos routing functionality, e.g. when the EtherType value 0x88CD indicating that Sercos is recognized, is recognized). As shown, some of the selection elements do not have connected states corresponding to each of the protocols, i.e. selection signals indicating a specific protocol may result in the disconnected state for those selection elements. There is no subsequent data flow at the output of the selection element.

The selection elements comprise at least two (in the example of the FIGURE, three) first selection elements 60, 62, 64, which are in a one-to-one relationship with the secondary interfaces 20, 22, 24. For each first selection element, the output of the selection element is connected to the transmitting terminal 28 of the secondary interface that corresponds to the selection element. The inputs of each first selection element 60, 62, 64 are connected to assigned outputs 40 of at least two (corresponding to the number of inputs of the corresponding first selection element) of the protocol modules 30, 32, 34, 36. In particular, (since each input is assigned to a protocol) each input is connected to a corresponding output of the protocol module that provides routing and/or switching functionality under the protocol to which the input is assigned, or, if more than one protocol module provides routing and/or switching functionality under that protocol, to any of those protocol modules.

The selection elements optionally include a second selection element 66. The output of the second selection element 66 is connected to the transmitting terminal 8 of the primary interface 2. The inputs of the second selection element 66 are connected to assigned outputs 40 of at least two (corresponding to the number of inputs of the assigned first selection elements) different protocol modules 30, 32, 34, 36. In particular, as with the first selection elements, each input is connected to a corresponding output of the protocol module that provides routing and/or switching functionality according to the protocol to which the input is assigned, or, if more than one protocol module provides routing and/or switching functionality according to that protocol, to one of those protocol modules.

The selection elements further include at least a third selection element 68 (in the embodiment of the FIGURE, a third selection element is included). The output of the third selection element 68 is connected to an assigned input 38 of the first protocol module 30. One input of the third selection element 68 is connected to the receiving terminal 6 of the primary interface 2 (i.e., it provides the aforementioned indirect connection of the receiving terminal 6 of the primary interface 2 and a protocol module). The other inputs of the third selection element are connected to the corresponding outputs of one or a plurality of protocol modules (depending on the protocol module connected to the output of the third selection element). In the embodiment shown in the FIGURE, one input of the third selection element 68 is connected to the fourth protocol module 36. Similar to the first and second selection elements, each of the other inputs is connected to a corresponding output of the protocol module that provides routing and/or switching functionality according to the protocol, or, if more than one protocol module provides routing and/or switching functionality according to this protocol, to one of these protocol modules.

In addition, the selection elements optionally include at least one fourth selection element (not shown). The output of the fourth selection element is connected to a corresponding input of a protocol module. The inputs of the fourth selection element are connected to the outputs of at least two protocol modules. The fourth selection element (if present) provides internal routing between protocol modules. As for the first and second selection elements, each input is connected to a corresponding output of the protocol module that provides routing and/or switching functionality according to the protocol to which the input is assigned or, if more than one protocol module provides routing and/or switching functionality according to that protocol, to one of those protocol modules.

Each of the modules and elements, i.e. the recognition module 14, the protocol modules 30, 32, 34, 36 and the selection elements 60, 62, 64, 66, 68 can be implemented independently of each other as a hardware module and/or software module. Various modules or elements can be implemented on different hardware modules.

In particular, the recognition module 14 and/or the protocol modules 30, 32, 34, 36 and/or the selection elements 60, 62, 64, 66, 68 can be implemented on an FPGA or as an ASIC. The FPGA's inputs and outputs can then be connected to Ethernet PHY transceivers. Alternatively, Ethernet PHY transceivers can also be implemented at least partially on the FPGA or ASIC.

What is claimed is:

1. A switching device for Ethernet-based fieldbuses, comprising:

a primary interface including a receiving terminal;

at least two secondary interfaces each with a transmitting terminal; and at least one of (i) a field-programmable gate array (FPGA) and (ii) an application-specific integrated circuit (ASIC), the at least one of the FPGA and the ASIC being configured to implement:

a plurality of protocol modules, wherein each protocol module is configured to provide switching and/or routing functionality according to one of a plurality of protocols, and wherein the receiving terminal of the primary interface is connected to assigned inputs of at least one of the protocol modules;

a recognition module configured to recognize predetermined type values at the receiving terminal of the primary interface of received Ethernet frames and to generate selection signals, wherein at least one of the predetermined type values is assigned to each protocol and each of the selection signals is assigned to one of the protocols, and wherein the recognition module is further configured, when one of the predetermined type values is recognized in a first Ethernet frame, to generate the selection signal assigned to the type value characterizing the protocol; and a plurality of selection elements each having at least two inputs and one output, wherein a protocol is assigned to each input, wherein each selection element is switchable to different states, wherein one or none of the inputs of the respective selection element is connected to the output of the respective selection element in each state, wherein each selection element is configured to switch to one of the states in response to the selection signal, such that the input of the protocol assigned to the selection signal is connected to the output of the selection element, wherein the selection elements comprise at least two first selection elements that are connected to the at least two secondary interfaces, and wherein each of the at least two inputs of the first selection elements is connected to one of the at least two protocol modules and the respective output of the first selection element is connected to the transmitting terminal of the secondary interface.

2. The switching device according to claim 1, wherein:

the Ethernet frames are standard-compliant according to IEEE 802.3 and/or ISO/IEC 8802-3 MAC standard and/or include EtherType values according to the IEEE 802.3 and/or ISO/IEC 8802-3 MAC standard, and/or the type values include a UDP port number.

3. The switching device according to claim 1, wherein:

the primary interface comprises a transmitting terminal and the first selection elements comprise a second selection element, the output of the second selection element is connected to the transmitting terminal of the primary interface, and the inputs of the second selection element are connected to correspondingly assigned outputs of at least two of the protocol modules.

4. The switching device according to claim 3, wherein:

the selection elements comprise at least one third selection element, the output of the at least one third selection element is connected to an assigned input of a protocol module, one of the inputs of the at least one third selection element is connected to the receiving terminal of the primary interface, and each of the inputs of the at least one third selection element is connected to a correspondingly assigned output of one or a plurality of the protocol modules.

5. The switching device according to claim 4, wherein:

the selection elements comprise at least one fourth selection element, the output of the at least one fourth selection element is connected to a correspondingly assigned input of a protocol module, and the inputs of the at least one fourth selection element are connected to correspondingly assigned outputs of at least two of the protocol modules.

6. The switching device according to claim 1, wherein:

the protocols include a default protocol, the selection module is configured to generate the selection signal indicating the default protocol upon initialization of the switching device and/or prior to receiving the first Ethernet frame, and/or each selection element is configured to change to the state corresponding to the selection signal indicating the default protocol upon initialization of the switching device and/or before receiving the selection signal from the recognition module.

7. The switching device according to claim 1, wherein:

the recognition module is configured to maintain the selection signal as long as a supply voltage is provided to the switching device or until a different selection signal is determined based on a type value of a different, second Ethernet frame received at the receiving terminal of the primary interface, and/or each selection element is configured to maintain the state after switching to one of the states until another selection signal is generated or as long as a supply voltage for the switching device is provided.

8. The switching device according to claim 1, wherein each selection element is configured such that when the selection element has no input assigned to a protocol specified in the selection signal, the selection element is configured to switch to a state in which none of the inputs of the selection element are connected to the output of the selection element.

9. The switching device according to claim 1, wherein the recognition module is configured not to generate the selection signal or to retain an applied selection signal when an Ethernet frame does not contain any of the predetermined type values.

10. The switching device according to claim 1, wherein a programming code for the FPGA is programmed in the FPGA, and causes the FPGA to configure the protocol modules, the recognition module, and/or the selection elements of the switching device.

11. A gate netlist which, comprising:

the switching device according to claim 1, wherein when the gate netlist is implemented on the FPGA, and wherein the gate netlist causes the FPGA to implement the protocol modules, the selection module, and/or the selection elements of the switching device.

* * * * *